Dec. 31, 1957  E. E. DAVIS  2,818,230
METHOD OF CORRECTING FOR LOST CIRCULATION OF DRILLING FLUIDS
Filed Feb. 8, 1954
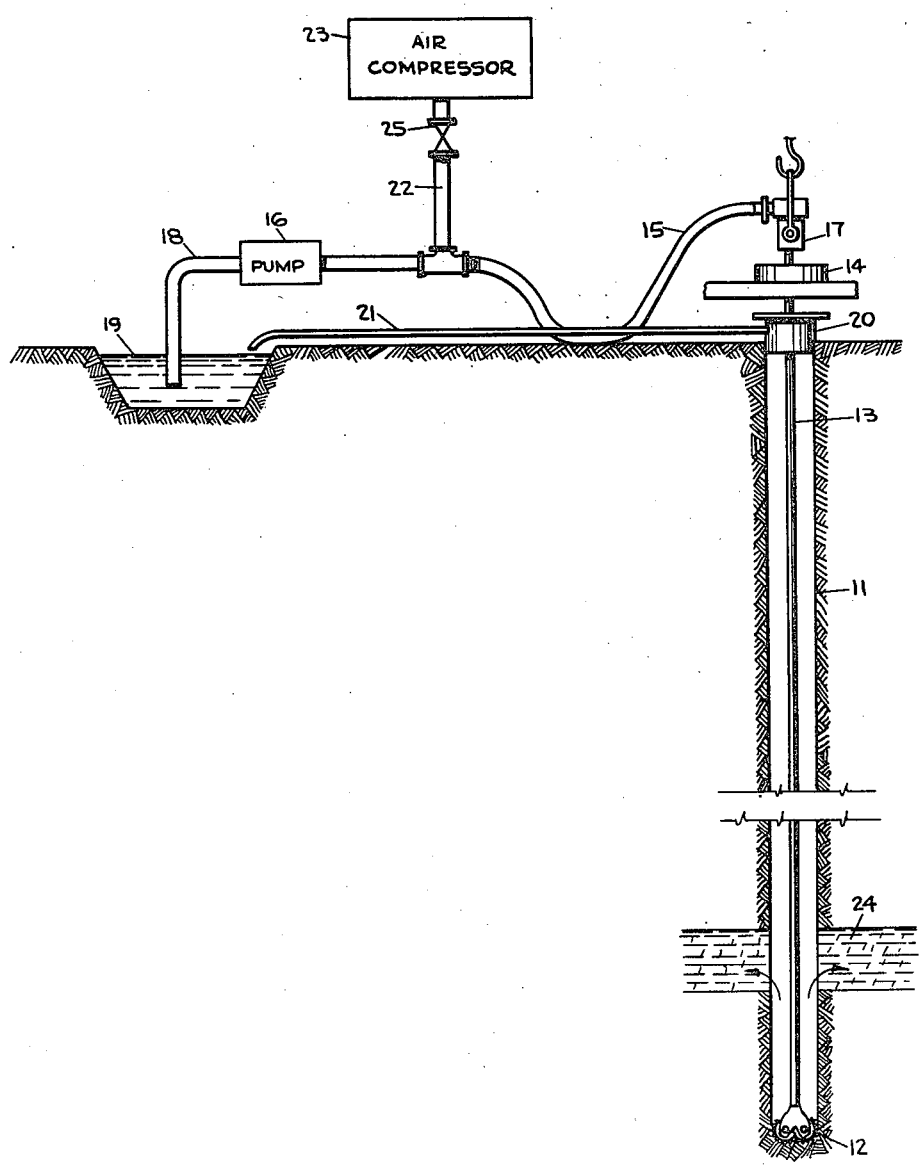
Inventor: E. E. Davis
By: J. H. McCarthy
His Agent

2,818,230

METHOD OF CORRECTING FOR LOST CIRCULATION OF DRILLING FLUIDS

Ellis E. Davis, Bellaire, Tex., assignor to Shell Development Company, Emeryville, Calif., a corporation of Delaware Application February 8, 1954, Serial No. 408,723

6 Claims. (Cl. 255—1.8)

This invention pertains to the drilling of oil wells and relates more particularly to a method for preventing or minimizing the loss of drilling fluid from a well borehole into porous and permeable formations and for correcting so-called lost circulation of drilling fluids in said well.

An essential feature in the rotary drilling of oil wells is the use of a drilling fluid or mud, consisting of a suspension of a material such as clay or calcium carbonate in a suitable liquid, such as water or oil or an emulsion thereof. The drilling fluid is sometimes weighted down with additional comminuted heavy materials, such as barytes, galena, red lead, crushed oyster shells, etc.

The functions of the drilling fluid are to lubricate the bit, to carry the cuttings up to the surface, to furnish a static head of liquid which overcomes formation pressures, and to form on the walls of the borehole a sheath capable of preventing or minimizing the penetration of the drilling fluid into the formation, and its loss therein.

As the drilling fluid is usually circulated in the borehole under a pressure greater than that of the formation, its liquid component, together with the smaller colloidal or solid particles suspended therein tends to flow into the permeable formations through the interstices, passages, or pores between the grains of formations such as sandstone, permeable limestones, etc. The larger clay or solid particles, however, tend to become arrested in such a manner to act as plugs or bridges, decreasing the size of the flow passages in the formation and allowing the smaller clay particles to become, in turn, arrested and to act as plugs in or over said passages. A drilling mud of good plastering properties quickly forms, in this manner, a substantially liquid-impervious mud sheath on the permeable portions of the wall of the borehole.

In many cases, however, the amounts of drilling fluid lost from the borehole to the formation depend less on the plastering properties of the drilling mud than on the structural characteristics of the strata traversed in the well and on the natural pressure of the fluids in said permeable strata. Thus, in low pressure, high permeability, porous formations, and especially in formations having fissures, cavities or crevices, the solid particles ordinarily present in the drilling mud easily pass through the openings, fissures, cavities or crevices or into the interstices between adjacent grains of sand or gravel without exerting any plugging action, with the result that large volumes of the expensive drilling mud are carried into the formations and lost, causing a loss of circulation of the mud, which may, in turn, lead to the cessation of drilling, the freezing of the drill string, the collapse of the walls of the borehole, or other undesirable consequences.

When such formations are drilled through, an attempt is made to prevent the loss of the drilling mud, and to cure lost circulation problems by adding various materials such as cottonseed hulls, mica flakes, sawdust, Celluloid or cellophane flakes, etc., to the mud and circulating the material-laden mud down the borehole until the particles of material plug the crevices, cavities, fissures or porous formation and prevent any further loss of drilling mud thereto.

Light weight materials of the above-named types tend to prevent the loss of circulation of drilling fluid in a borehole, and also the loss of drilling fluids to a porous formation, by furnishing a material that will plug or bridge on or in the permeable formation; also, the density of the drilling mud in the well is reduced to the lowest safe point and thereby reduces the hydrostatic pressure exerted by the column of drilling mud in the well above the permeable formation or zone of lost circulation. It is well known that in many wells, an increased loss of drilling fluid to the formation and possibly loss of circulation of the drilling fluid may be experienced when a mud is weighted to a high density.

For example, while drilling a well with a 90 lb./cu. ft. mud, a gas-bearing formation zone was drilled into. In order to prevent gas from this formation from coming into the well, the density of the mud was raised from 90 to 125 lb./cu. ft. However, the hydrostatic head exerted by the column of the 125 lb. mud in the borehole was sufficient to cause the loss of large quantities of drilling fluid into a permeable formation. Suitable materials were added to reduce the density of the mud to 117 lb./cu. ft. At this density of mud, the loss of fluid to the formation was only nominal while the static head was sufficient to prevent the intrusion of gas from the gas-bearing zone. Thus, it may be seen that the loss of drilling fluid to a formation was alleviated merely by means of reducing the density of the drilling mud employed.

It is, therefore, a primary object of the present invention to provide an improved method for minimizing or preventing the loss of drilling fluid to a formation.

Another object of this invention is to provide a method for preventing lost circulation of drilling fluid and re-establishing the flow of fluid from the annulus when circulation has been lost, by reducing the density of the drilling fluid being employed.

A further object of this invention is to provide a fast and inexpensive method of reducing the density of drilling fluid as it is being circulated in a well borehole during drilling operations.

Other objects and advantages will become apparent from the following description of the invention, taken with reference to the drawing which is a schematic view illustrating a well being drilled by the rotary method of drilling and illustrating apparatus embodying the present invention.

Referring to the drawing, a well borehole 11 is shown as being drilled by means of a bit 12 secured to a lower end of a drill string 13 which is rotated in the borehole from the surface by means of a conventional rotary table 14. A hose 15 is connected between the mud pump 16 or battery of mud pumps to the top of the drill string 13 by means of a swivel joint 17. The in-take line 18 to the pump 16 is immersed in a mud pit 19 located some distance from the well head 20. A mud discharge line 21 connects the well head 20 with the mud pit 19. Connected into the discharge line 15 of the pump 16 is the discharge line 22 of a standard air compressor 23.

During the normal course of drilling operations, drilling mud is picked up from the pit 19 by the pump in-take line 18 and is forced by the pump 16 through conduit or hose 15 and thence through hose swivel 17 and down the drill string 13 where it is discharged through the bit 12 at the bottom of the borehole 11. Normally, the fluid returns up the annular space between the drill string 13 and the wall of the borehole 11 and is discharged at the well head 20 through conduit 21 which conducts it back to the mud pit 19.

However, as illustrated in the drawing, the borehole may traverse a permeable formation 24 into which the drilling fluid flows as fast as the pump 16 circulates the drilling fluid down the well. Since none of the drilling fluid returns to the surface to be discharged back into the mud pit 19, the circulation of the drilling fluid in the borehole is said to be lost.

In accordance with the present invention, one or more air compressors 23 are connected with the discharge line 22 which communicates with the discharge conduit 15 from the pump 16. By arranging the equipment in this manner, compressed air or formation gas from an adjacent well may be injected to the flowing stream of drilling mud between the discharge of the pump 16 and the swivel joint 17 of the top of the drill string, whereby an aerated drilling fluid, that is, a mixture of drilling mud and air, is pumped down through the drill string 13 to be discharged at the bit 12 at the bottom of the borehole 11. The air can be introduced into the drilling mud stream simply by starting the compressor 23 and opening the valve 25 in the discharge line 22 from the compressor. Thus, air may be introduced into the drilling fluid stream far more rapidly than an addition of other sealing material or density reducing material. The introduction of compressed air into the drilling mud stream causes an instantaneous decrease in the density of the drilling mud.

In some well boreholes, although all of the drilling fluid may be lost to a permeable formation 24 as shown in the drawing, the level of the fluid in the borehole may be at a substantial distance above the permeable formation 24. The pressure forcing the drilling fluid into the permeable formation 24 is a combination of the pump pressure and of the hydrostatic head of drilling mud in the borehole above the permeable formation 24. Thus, one beneficial effect realized from the aeration of the drilling mud stream is that the mud is lightened to such an extent that the level of the fluid in the borehole rises to the top of the well and is discharged through the discharge conduit 21 back to the mud pit 19 in a normal manner thereby regaining circulation of the mud. Another beneficial effect of mud aeration is believed to be realized through the plugging effect that the entrained air bubbles in the mud have on plugging of the permeable formation 24. This is especially true at the more shallow levels.

The present method of recovering lost circulation in wells has been tested in drilling operations in Texas with considerable success. In drilling one well in Texas with a water-base mud, only about 10 to 15 gallons per minute or fluid were returned to the surface, the rest of the fluid being lost to a permeable formation. At the time of the test, the mud pump was pumping from 110 to 125 gallons per minute of fluid into the well. An air compressor was connected into the discharge line of the pump and air was injected into the drilling fluid stream in variable quantities, so that 100 or more gallons per minute of drilling fluid was returned to the surface. Actually, very foamy fluid returns of between 115 to 210 gallons per minute were obtained with the variable quantities of air being injected into the mud stream, of which about 100 gallons per minute constituted the water base mud. Similar success was enjoyed when using the present method of combating lost circulation in other wells wherein permeable formations had been traversed by the borehole. Preferably, the air or gas injected into the drilling mud is separated from the mud after it is circulated to the surface.

The amount of air that is injected into a drilling fluid to combat lost circulation depends on various factors, such as the density of the drilling mud being used, the depth of the permeable formation, the rate at which drilling mud is being lost to the permeable formation, and the level of the drilling fluid within the well borehole. For example, when drilling a well using a 9 lb./gal. mud (67.4 lb./cu. ft.), if the drilling mud is cut 90% with air so that air constitutes 90% of the air-water mixture being injected into the well, a reduction in pressure of 600 lb./sq. in. will be realized at the bottom of a 5,000 foot well. This reduction in pressure is sufficient to reestablish the return of drilling fluid under conditions where a loss zone had previously caused the level of drilling fluid in the well to stand 1300 feet below the surface. For heavier muds, the pressure reduction is somewhat greater than 600 lb./sq. in. at the bottom of a 5000 foot borehole while for water, it is slightly less.

For a 9 lb./gal. drilling mud cut 50% with compressed air, little reduction in bottom hole pressure is experienced below 1000 feet, although theoretically, there is some increased pressure reduction down to about 2600 feet. However, as the percentage of air in the drilling fluid is increased, much larger reductions in bottom hole pressures in lb./sq. in. are realized. Thus, in a well 3100 feet deep, a reduction in bottom hole pressure of 180 lb./sq. in. is obtained when the mud is 75% cut with air, a 520 lb./sq. in. reduction in bottom hole pressure when the mud is cut 90% with air, and a reduction in bottom hole pressure of over 1100 lb./sq. in. when the mud is cut 96.5% by air.

While the present invention has been described while using a single pump 16 and air compressor 23, as shown in the drawing, it is realized that one or more pumps and air compressors may be employed. If desired, these pumps and compressors may be arranged in stages so that each succeeding pump handles a mixture of air and drilling fluid having a greater percentage of air in it. In such a case, the subsequent pumps are preferably of greater capacity so that the original pump 16 may operate at its designed capacity. In practice, drilling mud should be cut at least 50% by volume with the gaseous medium.

The present method may be effectively employed when drilling with any type of mud, either oil base, water base or oil and water emulsions. It is to be realized that the extent to which a mud may be aerated according to the present method is limited by the formation pressures encountered during drilling. Thus, when drilling high pressure wells, care should be observed in introducing large quantities of air to the mud so that control of the well will not be lost.

I claim as my invention:

1. In the drilling of oil wells, the method of preventing loss of drilling fluid to the formation, said method comprising the steps of flowing to a well borehole a stream of drilling fluid containing finely-divided solids to establish in said borehole a fluid column having a hydrostatic head in excess of any formation pressures encountered in said borehole, injecting compressed air into the drilling fluid stream at the surface, and circulating the resultant aerated drilling fluid in the well in contact with the face of a permeable formation into which drilling fluid is being lost.

2. The method of preventing loss of drilling fluid during the drilling of oil wells comprising flowing to a well borehole a stream of drilling fluid containing finely-divided solids to establish in said borehole a fluid column having a hydrostatic head in excess of any formation pressures encountered in said borehole, injecting into the drilling fluid stream at the surface at least 50% by volume air at standard conditions and circulating the aerated fluid into the well to contact the faces of a permeable formation into which drilling fluid is being lost.

3. A drilling fluid composition for circulation in a well to prevent the loss of fluid into porous and permeable formations traversed by said well, comprising a drilling fluid containing finely-divided solid material having admixed therewith at least 50% by volume at standard conditions of a gaseous fluid.

4. A method of recovering lost circulation of drilling fluid during the drilling of an oil well traversing porous formations into which said drilling fluid is being lost, said method comprising the steps of flowing to a well borehole a stream of drilling fluid containing finely-divided solids to establish in said borehole a fluid column having a hydrostatic head in excess of any formation pressures encountered in said borehole, injecting into the drilling fluid prior to its entrance into the well a volume of gaseous fluid at a flow rate at least equal to the flow rate of the drilling fluid at standard conditions, pumping the mixture of gaseous and drilling fluids into the well to contact the face of the porous and permeable formations therein where bubbles of the gaseous fluid block the interstices of said porous and permeable formations into which drilling fluid is being lost, and circulating the fluid mixture upwardly in the well to the surface again.

5. A method of recovering lost circulation of drilling fluid during the drilling of an oil well traversing porous and permeable formations into which said drilling fluid is being lost, said method comprising the steps of flowing to a well borehole, a stream of drilling fluid containing finely-divided solids to establish in said borehole a fluid column having a hydrostatic head in excess of any formation pressures encountered in said borehole, injecting into the drilling fluid prior to its entrance into the well a volume of gaseous fluid at a flow rate at least equal to the flow rate of the drilling fluid at standard conditions, pumping the mixture of gaseous and drilling fluids into the well to contact the face of the porous and permeable formations therein where bubbles of the gaseous fluid block the interstices of said porous and permeable formations into which drilling fluid is being lost, circulating the fluid mixture upwardly in the well to the surface again, and separating the remaining gaseous fluid from said drilling fluid.

6. A method of drilling a well with well drilling tools through porous formations into which a drilling fluid may be lost, said method comprising steps of flowing to said well a stream of drilling fluid containing finely divided solids to establish in said well a fluid column having a hydrostatic head in excess of formation pressures encountered in said borehole, injecting into the drilling fluid prior to its entrance into the well a volume of gaseous fluid at a flow rate at least equal to the flow rate of the drilling fluid at standard conditions, pumping the mixture of gaseous and drilling fluids into the well to contact the face of the porous and the permeable formations therein to form a filter cake on the wall of said well to decrease the loss of fluid into the surrounding formations into which drilling fluid is being lost, and flowing the fluid mixture upwardly in the well to the surface again.

References Cited in the file of this patent

UNITED STATES PATENTS

| | | |
|---|---|---|
| 1,324,304 | Carmichael | Dec. 9, 1919 |
| 2,082,329 | Foran et al. | June 1, 1937 |
| 2,537,605 | Sewell | Jan. 9, 1951 |
| 2,726,063 | Ragland et al. | Dec. 6, 1955 |